United States Patent
Li et al.

(10) Patent No.: US 10,404,159 B2
(45) Date of Patent: Sep. 3, 2019

(54) ELECTRICAL CIRCUIT DEVICE

(71) Applicant: HITACHI AUTOMOTIVE SYSTEMS, LTD., Ibaraki (JP)

(72) Inventors: Jia Li, Tokyo (JP); Keisuke Fukumasu, Tokyo (JP); Yuji Sobu, Hitachinaka (JP); Hiroki Funato, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 16/078,055

(22) PCT Filed: Nov. 8, 2016

(86) PCT No.: PCT/JP2016/083114
§ 371 (c)(1),
(2) Date: Aug. 21, 2018

(87) PCT Pub. No.: WO2017/145449
PCT Pub. Date: Aug. 31, 2017

(65) Prior Publication Data
US 2019/0081555 A1  Mar. 14, 2019

(30) Foreign Application Priority Data
Feb. 23, 2016  (JP) .................................. 2016-031838

(51) Int. Cl.
*H02M 1/44* (2007.01)
*H02M 3/00* (2006.01)
(Continued)

(52) U.S. Cl.
CPC ................. *H02M 1/44* (2013.01); *B60L 1/00* (2013.01); *H02M 3/00* (2013.01);
(Continued)

(58) Field of Classification Search
CPC ....................................................... H02M 1/44
See application file for complete search history.

(56) References Cited

U.S. PATENT DOCUMENTS

| 2010/0320949 A1* | 12/2010 | Fotherby | H02M 7/48 318/400.26 |
|---|---|---|---|
| 2014/0240946 A1* | 8/2014 | Fukumasu | B60L 58/20 361/811 |
| 2015/0048675 A1 | 2/2015 | Fujii et al. | |

FOREIGN PATENT DOCUMENTS

| JP | 09-073766 A | 3/1997 |
|---|---|---|
| JP | 2014-183697 A | 9/2014 |

(Continued)

OTHER PUBLICATIONS

International Search Report of PCT/JP2016/083114 dated Dec. 27, 2016.

*Primary Examiner* — Daniel J Cavallari
(74) *Attorney, Agent, or Firm* — Mattingly & Malur, PC

(57) ABSTRACT

An electric circuit device includes a noise generating circuit unit which generates noises, a housing which stores the noise generating circuit unit thereinside, is electrically earthed, and includes an opening, a control board which is provided with a connector to connect a wiring to an outside, a base plate which is disposed between the noise generating circuit unit and the control board to cover the opening of the housing, and a high impedance component which has impedance higher than the base plate against the noises. The base plate includes a first base plate which supports the control board, and a second base plate which is separated from the first base plate. The first base plate and the second base plate are disposed to interpose the high impedance component therebetween.

8 Claims, 5 Drawing Sheets

(51) Int. Cl.
    *B60L 1/00*           (2006.01)
    *H02M 3/335*       (2006.01)
    *H02M 7/00*        (2006.01)
    H02M 1/12         (2006.01)
    B60L 3/00          (2019.01)

(52) U.S. Cl.
    CPC ....... *H02M 3/33507* (2013.01); *H02M 7/003* (2013.01); *B60L 3/003* (2013.01); *B60L 2210/10* (2013.01); *H02M 1/126* (2013.01); *H02M 2001/123* (2013.01)

(56) References Cited

FOREIGN PATENT DOCUMENTS

| | | |
|---|---|---|
| JP | 2016-015453 A | 1/2016 |
| WO | 2014/033852 A1 | 3/2014 |

* cited by examiner

[FIG. 1]
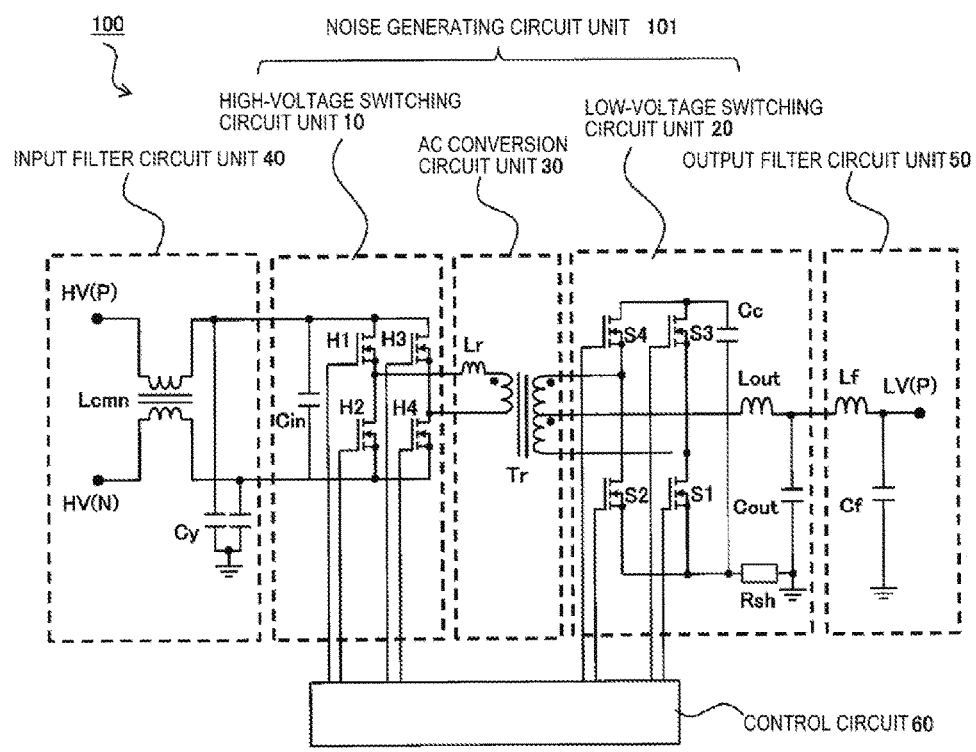

[FIG. 2]
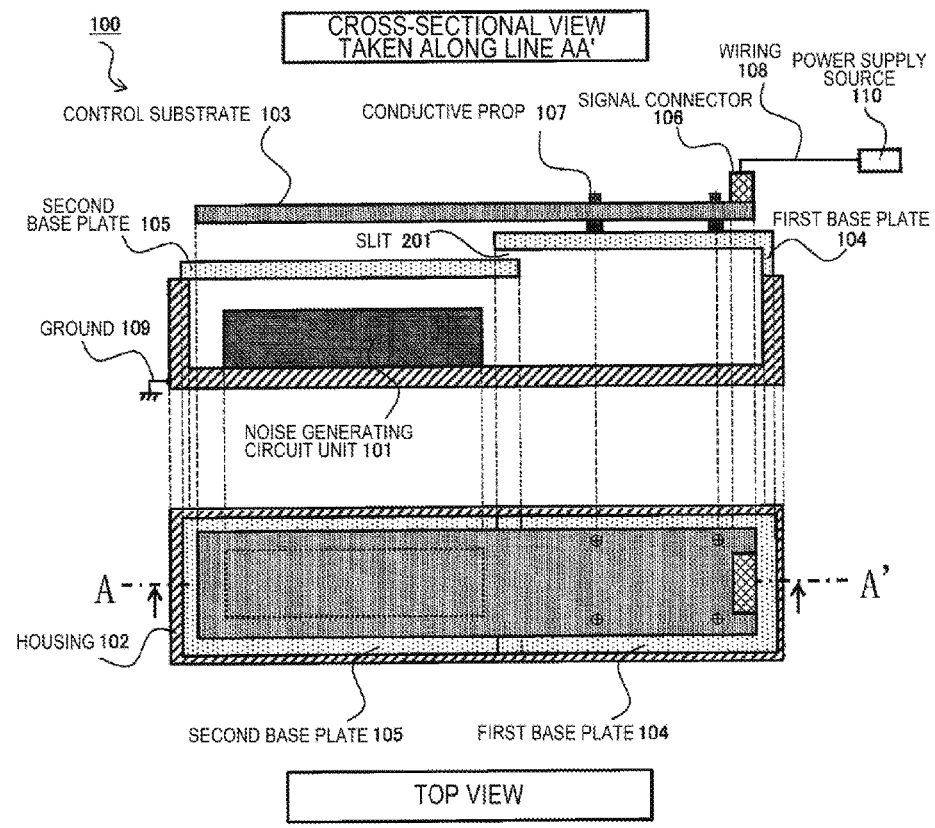

[FIG. 3]
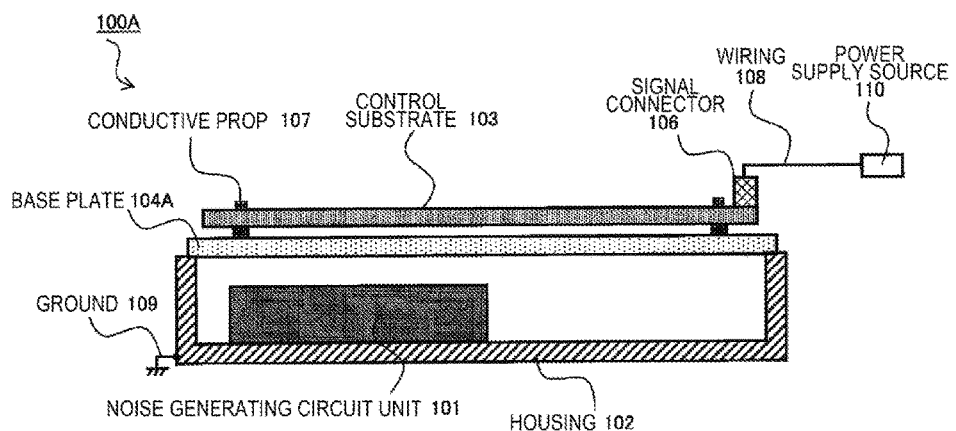
[FIG. 4]
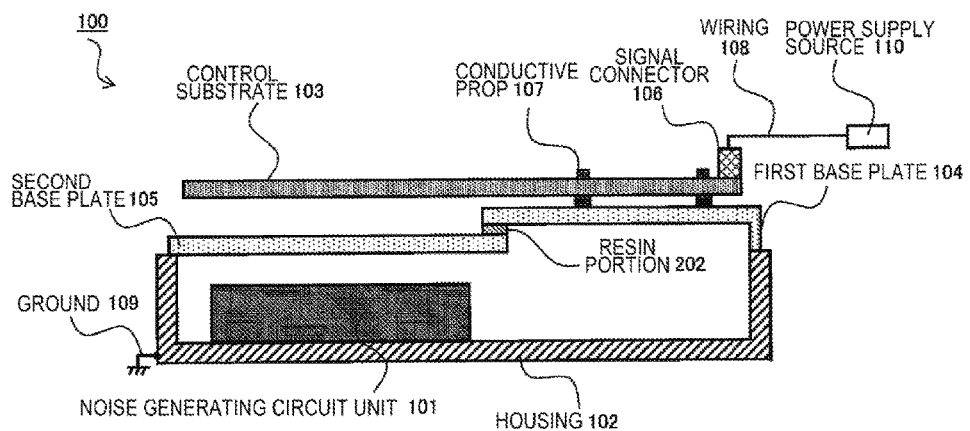

[FIG. 5]
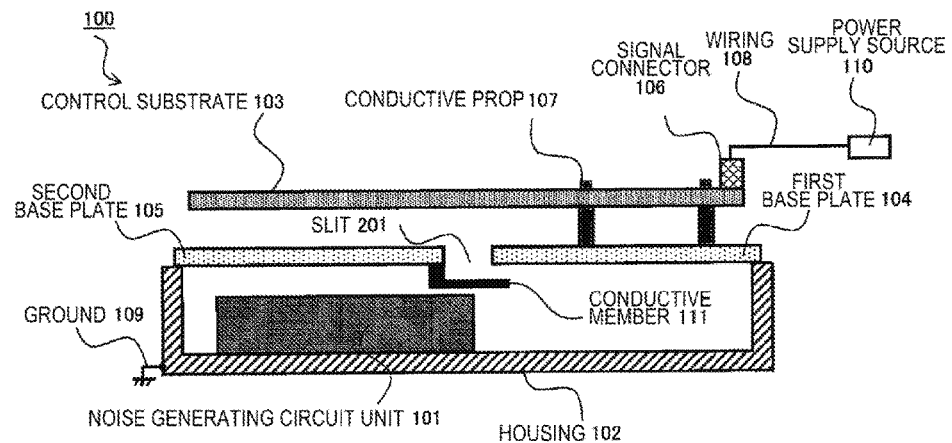
[FIG. 6]
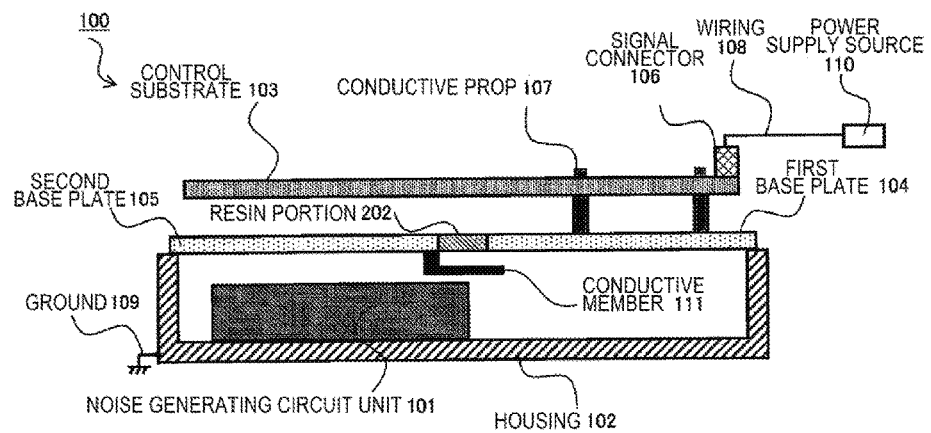

[FIG. 7]
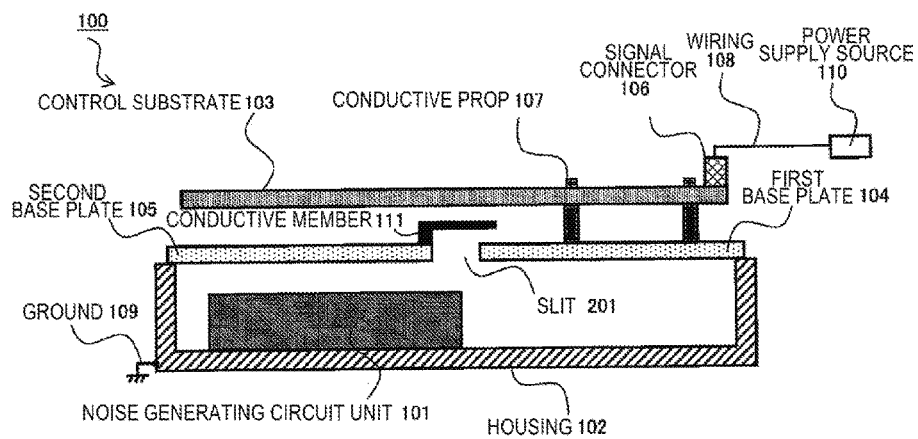

ELECTRICAL CIRCUIT DEVICE

TECHNICAL FIELD

The present invention relates to an electric circuit device.

BACKGROUND ART

In the related art, there is proposed a technique disclosed in PTL 1 for reducing conductive noises to the outside in a power conversion device. PTL 1 discloses a power conversion device for a vehicle in which a control circuit unit and a power circuit are respectively stored in separated closed spaces surrounded in a conductive housing and a multilayered printed circuit board in order to reduce the conductive noises by blocking electromagnetic coupling between these circuits.

CITATION LIST

Patent Literature

PTL 1: WO-A1-2014/33852

SUMMARY OF INVENTION

Technical Problem

In the technique disclosed in PTL 1, the control circuit unit and the power circuit are provided on the same multilayer printed circuit board. Therefore, it is not possible to completely block the electromagnetic coupling between these circuits. Further, there is a possibility that the conductive noises to the outside are not sufficiently reduced.

Solution to Problem

An electric circuit device according to the invention includes a noise generating circuit unit which generates noises, a housing which stores the noise generating circuit unit thereinside, is electrically earthed, and includes an opening, a control board which is provided with a connector to connect a wiring to an outside, a base plate which is disposed between the noise generating circuit unit and the control board to cover the opening of the housing, and a high impedance component which has impedance higher than that of the base plate against the noises. The base plate includes a first base plate which supports the control board and a second base plate which is separated from the first base plate. The first base plate and the second base plate are disposed to interpose the high impedance component therebetween.

Advantageous Effects of Invention

According to the invention, it is possible to reduce conductive noises from an electric circuit device to the outside.

BRIEF DESCRIPTION OF DRAWINGS

FIG. 1 is a diagram illustrating a circuit configuration of an electric circuit device according to an embodiment of the invention.

FIG. 2 is a view schematically illustrating a structure of the electric circuit device according to a first embodiment of the invention.

FIG. 3 is a view illustrating an exemplary structure of the electric circuit device according to the related art.

FIG. 4 is a view schematically illustrating the electric circuit device according to a second embodiment of the invention.

FIG. 5 is a view schematically illustrating a structure of the electric circuit device according to a third embodiment of the invention.

FIG. 6 is a view schematically illustrating a structure of the electric circuit device according to a fourth embodiment of the invention.

FIG. 7 is a view schematically illustrating a structure of the electric circuit device according to a fifth embodiment of the invention.

DESCRIPTION OF EMBODIMENTS

In a hybrid vehicle and an electric vehicle, power conversion devices such as an inverter and a DC/DC converter are mounted. In these power conversion devices, a DC voltage is converted to an AC voltage or other DC voltages by switching semiconductor elements. For example, in the DC/DC converter, several hundreds of DC high voltage supplied from a battery is converted into several tens of DC low voltage supplied to vehicle auxiliaries.

The power conversion device generally includes a high-voltage electric circuit and a low-voltage electric circuit. For example, the high-voltage electric circuit of the DC/DC converter includes a switching circuit which converts the DC voltage into the AC voltage or the AC voltage into the DC voltage, and a transformer which converts the AC voltage. In addition, the low-voltage electric circuit includes a control circuit which generates a control signal to control an operation of the switching circuit, and a filter circuit. In the power conversion device mounted in a vehicle, these circuits are desirably stored in the same metal housing for the purpose of miniaturization and integration. However, when the strong electric circuit and the weak electric circuit are stored in the same metal housing, electromagnetic noises generated from the strong electric circuit cause an electromagnetic coupling to the weak electric circuit. Therefore, conductive noises may be generated to the outside. In such a case, there occurs a problem that a level of the conductive noises does not satisfy a legal regulation or a noise regulation standard required for a vehicle.

Therefore, in the power conversion device which includes the strong electric circuit and the weak electric circuit according to the related art, the noise propagation from the strong electric circuit to the weak electric circuit is blocked using a metal plate in order to reduce the conductive noises to the outside. However, when a distance between the strong electric circuit and the metal plate is narrow as the power conversion device is miniaturized, the electromagnetic coupling between the strong electric circuit and the metal plate becomes strong, and thus a noise current is derived in the metal plate. If the noise current flows out to an externally-connected power supply source via the low-voltage electric circuit, there occurs a problem that the conductive noises interfere with external circuits.

The invention has been made in view of the above problem. In the following, an embodiment of an electric circuit device according to the invention will be described with reference to the drawings.

(First Embodiment)

FIG. 1 is a diagram illustrating a circuit configuration of an electric circuit device 100 according to an embodiment of the invention. The electric circuit device 100 illustrated in FIG. 1 is an example of a DC/DC converter which is provided between a high-voltage DC battery and a low-voltage DC battery and performs a power conversion in one or both directions. As illustrated in FIG. 1, the electric circuit device 100 includes a high-voltage switching circuit unit 10, a low-voltage switching circuit unit 20, an AC conversion circuit unit 30, an input filter circuit unit 40, an output filter circuit unit 50, and a control circuit 60.

The high-voltage switching circuit unit 10 converts a DC high voltage input from the high-voltage battery (not illustrated) through the input filter circuit unit 40 into an AC voltage, and outputs the AC voltage to the AC conversion circuit unit 30. The high-voltage switching circuit unit 10 includes switching elements H1, H2, H3, and H4, which are connected to each other as an H-bridge switching circuit, and a smoothing capacitor Cin. The switching elements H1 to H4 are configured using a MOSFET. Gate terminals of the switching elements H1 to H4 each are connected to the control circuit 60 through a gate resistor (not illustrated). Further, while not illustrated in the drawing, other electronic components and wiring patterns are provided in the high-voltage switching circuit unit 10.

The AC conversion circuit unit 30 converts an AC high voltage input from the high-voltage switching circuit unit 10 into an AC low voltage, and outputs the converted AC voltage to the low-voltage switching circuit unit 20. The AC conversion circuit unit 30 includes a resonance coil Lr and a transformer Tr.

The low-voltage switching circuit unit 20 performs a synchronous rectification of an active clamp type to convert a AC low voltage input from the AC conversion circuit unit 30 into a DC voltage, and outputs the converted DC voltage to a low-voltage battery (not illustrated) through the output filter circuit unit 50. The low-voltage switching circuit unit 20 includes switching elements S1, S2, S3, and S4, a coil Lout, capacitors Cc and Cout, and a resistor Rsh. The switching elements S1 to S4 are configured using a MOSFET. Gate terminals of the switching elements S1 to S4 each are connected to the control circuit 60 through a gate resistor (not illustrated). Further, the low-voltage switching circuit unit 20 may be configured using other rectification system, for example, a diode rectification system. In addition, while not illustrated in the drawing, other electronic components and wiring patterns are provided in the low-voltage switching circuit unit 20.

The high-voltage switching circuit unit 10, the low-voltage switching circuit unit 20, and the AC conversion circuit unit 30 generate noises along their operations. Therefore, these circuits will be collectively called a noise generating circuit unit 101.

The input filter circuit unit 40 and the output filter circuit unit 50 are a noise filter to remove a noise component from the input/output voltage of the electric circuit device 100. The input filter circuit unit 40 includes a common-mode filter Lcmn and a capacitor Cy. The output filter circuit unit 50 includes an inductor Lf and a capacitor Cf. Further, these filter circuits may be realized by other circuit configurations. In addition, each filter element may be realized by a plurality of elements.

The control circuit 60 is connected to the gate terminals of the switching elements H1 to H4 of the high-voltage switching circuit unit 10 and the gate terminals of the switching elements S1 to S4 of the low-voltage switching circuit unit 20. The control circuit 60 performs a predetermined process to calculate a switching state of each of the switching elements H1 to H4 and the switching elements S1 to S4, and outputs the control signal (switching signal) to each gate terminal on the basis of the calculation result. The switching elements H1 to H4 and the switching elements S1 to S4 each perform switching according to the control signal output from the control circuit 60 to operate each of the high-voltage switching circuit unit 10 and the low-voltage switching circuit unit 20 so as to perform the power conversion as described above.

Further, in the diagram of the circuit configuration of FIG. 1, the respective circuit elements of the electric circuit device 100 are attached with circuit symbols which do not represent the number of elements. Therefore, each circuit element may be realized by one element, or may be realized using a plurality of elements. In addition, the input filter circuit unit 40 is not essential, and whether to be employed may be decided according to a specification of the electric circuit device 100.

FIG. 2 is a diagram schematically illustrating a structure of the electric circuit device 100 according to the first embodiment of the invention. The lower side of FIG. 2 is a top view of the electric circuit device 100, and the upper side is a cross-sectional view of the electric circuit device 100. Further, the cross-sectional view on the upper side is taken along line A-A' illustrated in the top view on the lower side.

As illustrated in FIG. 2, the electric circuit device 100 according to the first embodiment of the invention includes the noise generating circuit unit 101, a housing 102, a control board 103, a first base plate 104, and a second base plate 105.

The noise generating circuit unit 101 is a circuit part which generates noises as described above, and corresponds to the high-voltage switching circuit unit 10, the low-voltage switching circuit unit 20, and the AC conversion circuit unit 30 of FIG. 1. When viewing the electric circuit device 100 from the upper side, the noise generating circuit unit 101 is located on the lower side of the control board 103 and the second base plate 105 while not be able to be seen. Therefore, in the top view of FIG. 2, the noise generating circuit unit 101 is illustrated with a dotted rectangular shape.

The metal housing 102 is formed in a box shape having an opening on the upper side, and stores thereinside the noise generating circuit unit 101. The housing 102 is connected to a ground 109 and electrically earthed. In a case where the electric circuit device 100 is mounted in a vehicle such as a hybrid vehicle and an electric vehicle, the ground 109 corresponds to a body of the vehicle. In this case, the housing 102 becomes the same potential as the body of the vehicle. Further, FIG. 2 illustrates an example in which only one noise generating circuit unit 101 is stored in the housing 102. However, a plurality of noise generating circuit units 101 and other components may be stored in the housing 102. In addition, the shape of the housing 102 may be appropriately changed according to the number of stored components and the size. For example, the housing 102 extends in a horizontal direction (a direction to the lower side in the top view of FIG. 2), and may store other components in the extending direction.

The control board 103 is mounted with the control circuit 60 of FIG. 1, and is provided with a signal connector 106 to connect a wiring 108 to the outer side. With the connection of the wiring 108 to the signal connector 106, the control board 103 is electrically connected to a power supply source 110 of an external low-voltage power supply system and a communication device (not illustrated) through the wiring 108. With this configuration, power and communication signals can be input to the control circuit 60 to operate the control circuit 60. The control board 103 is electrically connected to the housing 102 through a plurality of conductive props 107 which are provided in the first base plate 104.

The metal first base plate 104 and the metal second base plate 105 are disposed to cover the opening of the housing 102 between the noise generating circuit unit 101 and the control board 103. The first base plate 104 supports the control board 103 by the plurality of conductive props 107, and electrically connected to the control board 103 through the conductive prop 107. The second base plate 105 is disposed at a position on the lower side from the first base plate 104, that is, a position near the noise generating circuit unit 101 from the first base plate 104. A slit 201 is formed between the first base plate 104 and the second base plate 105. The slit 201 has impedance higher than those of the first base plate 104 and the second base plate 105 against the noise generated by the noise generating circuit unit 101. In other words, the slit 201 serves as a high impedance component with respect to the noise compared to the first base plate 104 and the second base plate 105.

Herein, the structure of the electric circuit device 100 illustrated in FIG. 2 and the structure of the electric circuit device of the related art will be described. FIG. 3 is a diagram illustrating an exemplary structure of an electric circuit device 100A according to the related art. Further, the portions of FIG. 3 corresponding to FIG. 2 will be attached with the same symbols. In addition, FIG. 3 illustrates only the cross-sectional view of the electric circuit device 100A for the comparison to the drawing on the upper side of FIG. 2 while the top view is omitted.

In the electric circuit device 100A of the related art illustrated in FIG. 3, a sheet of metal base plate 104A is disposed to prevent an electromagnetic noise coupling between the noise generating circuit unit 101 and the control board 103. The base plate 104A supports the control board 103 using the plurality of conductive props 107. With the base plate 104A, the noise from the noise generating circuit unit 101 is blocked. However, in the structure of the electric circuit device 100A of the related art, a distance between the noise generating circuit unit 101 and the base plate 104A is narrow due to miniaturization. Accordingly, the electromagnetic coupling between the noise generating circuit unit 101 and the base plate 104A becomes strong to derive a noise current from the base plate 104A. The noise current flows out to the external power supply source 110 through the control board 103, the signal connector 106, and the wiring 108, and thus the conductive noises may be emitted to the outside.

Therefore, in order to solve such a problem, the electric circuit device 100 according to the first embodiment of the invention is configured such that the metal base plate inserted between the noise generating circuit unit 101 and the control board 103 is divided into two sheets of the first base plate 104 and the second base plate 105 as illustrated in FIG. 2. Then, the slit 201 is provided as a high impedance component between these base plates as described above. With such a configuration, the conductive noises to the outside are reduced.

A layout relation among the components in the electric circuit device 100 according to the first embodiment of the invention is as follows. In the electric circuit device 100 according to the first embodiment of the invention, the first base plate 104 and the second base plate 105 are disposed to interpose the slit 201 therebetween. In other words, when viewed from a cross-sectional direction of FIG. 2 (a direction perpendicular to a principal surface of the first base plate 104), at least a part of the surface of the first base plate 104 and at least a part of the surface of the second base plate 105 interpose the slit 201 which operates as a high impedance component therebetween, and are disposed to face each other. Further, a width in the horizontal direction of the slit 201 is the same as that of the first base plate 104 and the second base plate 105. In addition, the second base plate 105 is disposed at a position near the noise generating circuit unit 101 from the first base plate 104. The control board 103 is disposed on the opposite side to the second base plate 105 with respect to the first base plate 104. The first base plate 104 and the second base plate 105 commonly abut on the housing 102 to be electrically connected to the housing 102. Further, the first base plate 104 supports the control board 103 by the conductive prop 107 electrically connected to the control board 103.

The description below will be given about the reason why the amount of the conductive noises to the outside can be reduced by disposing the components in the electric circuit device 100 according to the first embodiment of the invention. In the structure of the electric circuit device 100A of the related art illustrated in FIG. 3, the noise generating circuit unit 101 is blocked by one base plate 104A. Therefore, the noise current generated by the electromagnetic noises from the noise generating circuit unit 101 flows out to the external power supply source 110 sequentially through the base plate 104A, the conductive prop 107, the control board 103, the signal connector 106, and the wiring 108. On the other hand, in the structure of the electric circuit device 100 according to the first embodiment of the invention illustrated in FIG. 2, the base plate blocking the noise generating circuit unit 101 is divided into the first base plate 104 and the second base plate 105, and the slit 201 as a high impedance component is provided therebetween. Therefore, the noise current generated by the electromagnetic noises from the noise generating circuit unit 101 can flow to the ground 109 through the housing 102 from the second base plate 105 which has low impedance. Therefore, the noise current flowing out to the external power supply source 110 can be reduced compared to the structure of the related art.

According to the first embodiment of the invention described above, the following operations and effects are achieved.

(1) The electric circuit device 100 includes the noise generating circuit unit 101 which generates noises, the housing 102 which stores the noise generating circuit unit 101 thereinside and is electrically earthed, and includes an opening, the control board 103 which is provided with the signal connector 106 to connect the wiring 108 to the outside, the base plate (the first base plate 104, the second base plate 105) which is disposed to cover the opening of the housing 102 between the noise generating circuit unit 101 and the control board 103, and the slit 201 which is a high impedance component having impedance higher than the base plate against the noises. The base plate includes the first base plate 104 to support the control board 103 and the second base plate 105 separated from the first base plate 104. The first base plate 104 and the second base plate 105 are disposed to interpose the slit 201 therebetween. With such a configuration, the conductive noises from the electric circuit device 100 to the outside can be reduced.

(2) At least a part of the surface of the first base plate 104 and at least a part of the surface of the second base plate 105 are disposed to interpose the slit 201 therebetween and to face each other. With such a configuration, the conductive noises from the electric circuit device 100 to the outside can be certainly and effectively reduced.

(3) The high impedance component having high impedance higher than the base plate against the noises is the slit 201 which is provided between the first base plate 104 and the second base plate 105. Therefore, it is possible to easily realize the high impedance component.

(4) The second base plate 105 is disposed at a position near the noise generating circuit unit 101 from the first base plate 104. The control board 103 is disposed on the opposite side to the second base plate 105 with respect to the first base plate 104. In addition, the first base plate 104 supports the control board 103 by the conductive prop 107 which is electrically connected to the control board 103. With such a configuration, the noise current generated by the electromagnetic noises from the noise generating circuit unit 101 flows to the ground 109 from the second base plate 105 through the housing 102, so that it is possible to achieve a reduction of the conductive noises to the outside (Second Embodiment)

Hereinbelow, a second embodiment of the invention will be described. FIG. 4 is a diagram schematically illustrating a structure of the electric circuit device 100 according to the second embodiment of the invention. FIG. 4 is different from the first embodiment illustrated in FIG. 2 in that the slit 201 is replaced with a resin portion 202. Further, FIG. 4 illustrates only the cross-sectional view of the electric circuit device 100, and the top view is omitted.

The resin portion 202 is an insulating member made of a resin material, and has impedance higher than those of the first base plate 104 and the second base plate 105 against the noises generated by the noise generating circuit unit 101 similarly to the slit 201. In other words, the resin portion 202 serves as a high impedance component against the noises compared to the first base plate 104 and the second base plate 105. Therefore, as described in the first embodiment, the noise current generated by the electromagnetic noises from the noise generating circuit unit 101 can flow to the ground 109 from the second base plate 105 having low impedance through the housing 102. Therefore, the noise current flowing out to the external power supply source 110 can be reduced compared to the structure of the related art.

According to the second embodiment of the invention, the same operational effects as those of the first embodiment are achieved. Further, the same operational effects can be achieved even using an insulating material other than the resin material instead of the resin portion 202.

(Third Embodiment)

Hereinbelow, a third embodiment of the invention will be described. FIG. 5 is a diagram schematically illustrating a structure of the electric circuit device 100 according to the third embodiment of the invention. FIG. 5 is different from the first embodiment illustrated in FIG. 2 in that the first base plate 104 and the second base plate 105 are disposed horizontally, and the slit 201 is provided therebetween, and in that there is further provided with a conductive member 111 which is disposed to cover the slit 201. Further, FIG. 5 illustrates only the cross-sectional view of the electric circuit device 100, and the top view is omitted.

In the electric circuit device 100 of the embodiment, one side of the first base plate 104 and one side of the second base plate 105 are disposed to interpose the slit 201 which serves as a high impedance component therebetween, and to face each other. Then, the conductive member 111 is disposed to prevent that the electromagnetic noises generated by the noise generating circuit unit 101 from leaking out of the slit 201 to the control board 103. The conductive member 111 is electrically connected to the second base plate 105, protrudes from the second base plate 105 to the noise generating circuit unit 101, and covers the slit 201 from the inside of the housing 102. With such a structure, the electromagnetic noises are reflected and absorbed on the surface of the conductive member 111 before the electromagnetic noises pass through the slit 201 and leak out to the control board 103. Therefore, the noise current can flow to the ground 109 from the conductive member 111 having low impedance through the second base plate 105 and the housing 102. Further, since the distance between the control board 103 and the second base plate 105 can be made narrow, it is possible to minimize the electric circuit device 100.

According to the third embodiment of the invention, the following operational effects (5) and (6) are achieved in addition to the operational effect (1) described in the first embodiment.

(5) The electric circuit device 100 further includes the conductive member 111 which is electrically connected to the second base plate 105. In addition, one side of the first base plate 104 and one side of the second base plate 105 are disposed to interpose the slit 201 which is a high impedance component therebetween and to face each other, and the conductive member 111 is disposed to cover the slit 201. With such a configuration, the conductive noises from the electric circuit device 100 to the outside can be securely and effectively reduced.

(6) The conductive member 111 protrudes from the second base plate 105 toward the noise generating circuit unit 101, and is disposed to cover the slit 201 from the inside of the housing 102. With such a configuration, it is possible to effectively reduce the electromagnetic noises which pass through the slit 201 from the noise generating circuit unit 101 and leak out to the control board 103.

(Fourth Embodiment)

Hereinbelow, a fourth embodiment of the invention will be described. FIG. 6 is a diagram schematically illustrating a structure of the electric circuit device 100 according to the fourth embodiment of the invention. FIG. 6 is different from the third embodiment illustrated in FIG. 5 in that the slit 201 is replaced with the resin portion 202. Further, FIG. 6 illustrates only the cross-sectional view of the electric circuit device 100, and the top view is omitted.

As described in the second embodiment, the resin portion 202 is an insulating member made of a resin material, and has impedance higher than those of the first base plate 104 and the second base plate 105 against the noises generated by the noise generating circuit unit 101 similarly to the slit 201. In other words, the resin portion 202 operates as a high impedance component against the noises compared to the first base plate 104 and the second base plate 105. Therefore, as described in the third embodiment, the electromagnetic noises are reflected on the surface of the conductive member 111 and absorbed to the inside so as to be reduced before the electromagnetic noises pass through the resin portion 202 and leak out to the control board 103. The noise current can flow to the ground 109 from the conductive member 111 having low impedance through the second base plate 105 and the housing 102. Therefore, the noise current flowing out to the external power supply source 110 can be reduced compared to the structure of the related art.

According to the fourth embodiment of the invention, the same operations and effects as those of the third embodiment are achieved. Further, the same operational effects can be achieved even using an insulating material other than the resin material instead of the resin portion 202.

(Fifth Embodiment)

Hereinbelow, a fifth embodiment of the invention will be described. FIG. 7 is a diagram schematically illustrating a structure of the electric circuit device 100 according to the fifth embodiment of the invention. FIG. 7 is different from the third embodiment illustrated in FIG. 5 in that the conductive member 111 protrudes upward. Further, FIG. 7 illustrates only the cross-sectional view of the electric circuit device 100, and the top view is omitted.

In the electric circuit device 100 of the embodiment, the conductive member 111 protrudes from the second base plate 105 toward the control board 103, and disposed to cover the slit 201 from the outside of the housing 102. With such a structure, the electromagnetic noises are reflected on the surface of the conductive member 111 and absorbed to the inside so as to be reduced before the electromagnetic noises passed through the slit 201 leak out to the control board 103, similarly to the third embodiment. The noise current can flow to the ground 109 from the conductive member 111 having low impedance through the second base plate 105 and the housing 102. Therefore, it is possible to effectively reduce the electromagnetic noises which pass through the slit 201 from the noise generating circuit unit 101 and leak out to the control board 103.

Further, the respective embodiments of the invention are given as merely exemplary, but the content described in the respective embodiments is not interpreted in a limited way. For example, the invention is not limited to the power conversion device which is mounted to a vehicle such as a hybrid vehicle and an electric vehicle, and may be applied to other power conversion devices such as a power conversion device used in a construction machine or a railway vehicle.

In addition, the respective embodiments and the modifications are given as merely exemplary, the features of the invention are not adversely affected, and the invention is not limited thereto. The invention is not limited to the above embodiments, and various types of modifications may be included within a scope not departing form the spirit of the invention.

The following priority is claimed on Japanese Patent Application No. 2016-31838 filed on Feb. 23, 2016, the content of which is incorporated herein by reference.

REFERENCE SIGNS LIST

10: high-voltage switching circuit unit
20: low-voltage switching circuit unit
30: AC conversion circuit unit
40: input filter circuit unit
50: output filter circuit unit
60: control circuit
100: electric circuit device
101: noise generating circuit unit
102: housing
103: control board
104: first base plate
105: second base plate
106: signal connector
107: conductive prop
108: wiring
109: ground
110: power supply source
111: conductive member
201: slit
202: resin portion

The invention claimed is:

1. An electric circuit device, comprising:
a noise generating circuit unit which generates noises;
a housing which stores the noise generating circuit unit thereinside, is electrically earthed, and includes an opening;
a control board which is provided with a connector to connect a wiring to an outside;
a base plate which is disposed between the noise generating circuit unit and the control board to cover the opening of the housing; and
a high impedance component which has impedance higher than that of the base plate against the noises, wherein
the base plate includes a first base plate which supports the control board and a second base plate which is separated from the first base plate, and
the first base plate and the second base plate are disposed to interpose the high impedance component therebetween.

2. The electric circuit device according to claim 1, wherein
at least a part of a surface of the first base plate and at least a part of a surface of the second base plate are disposed to interpose the high impedance component therebetween and to face each other.

3. The electric circuit device according to claim 2, wherein
the high impedance component is a slit which is provided between the first base plate and the second base plate.

4. The electric circuit device according to claim 2, wherein
the high impedance component is a resin portion which is made of a resin material.

5. The electric circuit device according to claim 1, wherein
the second base plate is disposed at a position near the noise generating circuit unit from the first base plate,
the control board is disposed on an opposite side to the second base plate with respect to the first base plate, and
the first base plate supports the control board by a conductive prop which is electrically connected to the control board.

6. The electric circuit device according to claim 1, further comprising:
a conductive member which is electrically connected to the second base plate, wherein
one side of the first base plate and one side of the second base plate are disposed to interpose the high impedance component therebetween and to face each other, and
the conductive member is disposed to cover the high impedance component.

7. The electric circuit device according to claim 6, wherein
the conductive member protrudes from the second base plate toward the noise generating circuit unit, and are disposed to cover the high impedance component from an inside of the housing.

8. The electric circuit device according to claim 6, wherein
the conductive member protrudes from the second base plate toward the control board, and is disposed to cover the high impedance component from an outside of the housing.

* * * * *